(12) United States Patent
Koscielniak et al.

(10) Patent No.: US 10,570,935 B2
(45) Date of Patent: Feb. 25, 2020

(54) ACTUATOR RATE CONTROL WITH ENERGY ABSORBING PRESSURE RELIEF SYSTEM

(71) Applicant: ITT MANUFACTURING ENTERPRISES LLC, Wilmington, DE (US)

(72) Inventors: John T. Koscielniak, Blasdell, NY (US); Terrance E. Daul, Hamburg, NY (US); Jeffrey T. Kelly, Orchard Park, NY (US)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 358 days.

(21) Appl. No.: 15/497,509

(22) Filed: Apr. 26, 2017

(65) Prior Publication Data

US 2017/0314583 A1 Nov. 2, 2017

Related U.S. Application Data

(60) Provisional application No. 62/330,632, filed on May 2, 2016.

(51) Int. Cl.
*B64C 1/14* (2006.01)
*F15B 15/14* (2006.01)
(Continued)

(52) U.S. Cl.
CPC .......... *F15B 15/204* (2013.01); *B64C 1/1423* (2013.01); *E05F 3/108* (2013.01);
(Continued)

(58) Field of Classification Search
CPC ... E05F 1/105; E05F 3/108; E05F 3/12; E05F 3/224; E05Y 2201/424; E05Y 2201/474;
(Continued)

(56) References Cited

U.S. PATENT DOCUMENTS 3,408,683 A 11/1968 Zahn
5,784,740 A * 7/1998 DiSieno ............. B65G 69/2841
14/71.3

(Continued)

FOREIGN PATENT DOCUMENTS

DE   11 49 271       5/1963
DE   1149271 B   *  5/1963  .............. E05F 3/108
DE   102 36 137 A1   2/2004

OTHER PUBLICATIONS

European Extended Search Report for EP 17 169 024.1; dated Oct. 5, 2017; 8 pages.

(Continued)

*Primary Examiner* — Claude J Brown
(74) *Attorney, Agent, or Firm* — Barclay Damon LLP

(57) ABSTRACT

An actuator includes a piston assembly movably disposed within an assembly housing having a fixedly supported end and an opposing end that receives a movable piston assembly. The piston assembly includes a piston rod and an attached piston head having a fixed orifice as well as an orifice with a check valve to create rate control of the assembly. Hydraulic fluid is caused to move through the axially movable piston head based on compressive and tensile loads imparted to the assembly. A plurality of pre-loaded springs are configured to selectively provide pressure relief in the event the orifices of the piston become clogged, wherein the plurality of pre-loaded springs, such as disc springs, further provide an energy absorbing function of the assembly based on loading conditions.

20 Claims, 9 Drawing Sheets

(51) Int. Cl.
  *F15B 15/20* (2006.01)
  *E05F 3/10* (2006.01)
  *E05F 3/22* (2006.01)
  *E05F 3/12* (2006.01)
  *F15B 15/22* (2006.01)
  *E05F 1/10* (2006.01)

(52) U.S. Cl.
  CPC ............... *E05F 3/12* (2013.01); *E05F 3/224* (2013.01); *F15B 15/149* (2013.01); *F15B 15/1447* (2013.01); *F15B 15/226* (2013.01); *F15B 15/227* (2013.01); *E05F 1/105* (2013.01); *E05Y 2201/424* (2013.01); *E05Y 2201/474* (2013.01); *E05Y 2800/205* (2013.01); *E05Y 2800/24* (2013.01); *E05Y 2800/404* (2013.01); *E05Y 2900/502* (2013.01)

(58) Field of Classification Search
  CPC ........... E05Y 2800/205; E05Y 2800/24; E05Y 2800/404; E05Y 2900/502; B64C 1/1423; F15B 15/1447; F15B 15/149; F15B 15/204; F15B 15/226; F15B 15/227
  USPC ...................................................... 244/129.5
  See application file for complete search history.

(56) References Cited

U.S. PATENT DOCUMENTS

| | | |
|---|---|---|
| 2004/0104522 A1 | 6/2004 | Wolf et al. |
| 2015/0143987 A1* | 5/2015 | Roberts ................ B64C 1/1423 91/4 R |
| 2016/0263960 A1* | 9/2016 | Teraoka .................... F16F 9/34 |

OTHER PUBLICATIONS

European Office Action for EP 17 169 024.1; dated Jun. 28, 2019; 3 pages.

\* cited by examiner

ACTUATOR RATE CONTROL WITH ENERGY ABSORBING PRESSURE RELIEF SYSTEM

CROSS REFERENCE TO RELATED APPLICATION

This application claims priority upon U.S. Patent Application Ser. No. 62/330,632, filed May 2, 2016, under relevant portions of 35 U.S.C. § 119 and 37 CFR § 1.53. The entire contents of this document is hereby incorporated by reference.

TECHNICAL FIELD

This application is generally directed to the field of actuator assemblies and more specifically to an actuator assembly that permits rate control, as well as an energy absorbing pressure relief. The actuator assembly can be used preferably in connection with an emergency door used on commercial aircraft.

BACKGROUND

Emergency doors as used in connection with commercial aircraft are movable between a closed or locked state and an opened state. Upon opening, the emergency door is typically moved outside the aircraft and away from the door opening but is still attached. Upon opening of the emergency door, an inflatable slide is deployed to enable passengers to leave the aircraft.

Actuators often used in connection with the opening of the emergency doors include a spring means to open the door from a closed to an opened position and a piston assembly having a piston rod and at least one piston head that is configured to move within a sealed cylinder containing a hydraulic fluid. The piston head includes at least one orifice that permits fluidic flow between defined chambers to produce a resisting force to control the opening rate of the door. A shock absorbing end stop is also incorporated to prevent a high load on the door assembly when the door reaches its fully open position.

BRIEF DESCRIPTION

According to one aspect, there is provided an actuator assembly comprising a cylindrical housing having opposing first and second ends and a hollow interior; a movable piston assembly disposed within the interior, the piston assembly including a piston head having a fixed orifice; and a check valve disposed in another orifice. The actuator assembly further comprises spring means disposed in relation to the piston head, the spring means being compressible to create energy storage at the end of the extension stroke.

In one version, a pressure relief valve is also provided in the event that fluid movement through the orifices of the piston head is disabled. The pressure relief valve is enabled by movement of the piston head against the spring means, such as, for example, a plurality of disc springs that are caused to move in the event the fixed orifice of the piston head is blocked and enabling fluid flow along a flat of the piston rod through a defined flow path from the high pressure side to the low pressure side of the piston head in the hydraulic chamber.

According to one embodiment, one connecting end of the assembly housing including the piston assembly is configured for attachment to an emergency door of an aircraft and an opposing end of the housing is configured for fixed attachment to an aircraft structure.

In at least one version, an accumulator piston is disposed in an end of the assembly housing opposite the piston assembly, in which the accumulator piston is biased by a coil spring. The herein described assembly further includes at least one pre-loaded coil spring attached onto the exterior of the assembly housing to provide the actuation force.

According to another aspect, there is provided an actuator assembly comprising an assembly housing having opposing first and second ends and a hollow interior. At least one coil spring is attached to the exterior of the assembly housing and a bearing member is fixedly attached within the interior of the assembly housing and sealingly engaged therewith. The actuator assembly further comprises a piston assembly made up of a piston rod and a piston head having a plurality of axial orifices. The piston assembly is movable through a sealed opening of the bearing member into a chamber filled with hydraulic fluid. A check valve is disposed in one of the axial orifices, the check valve preventing fluid flow through the orifice when fluid is moved in one axial direction. An accumulator piston biased by an accumulator spring is disposed at an opposite end of the assembly housing relative to the bearing member, and at least one spring is disposed adjacent to the piston head and pre-loaded in compression to enable energy storage of an applied load.

According to a preferred embodiment, a pressure relief valve is enabled by fluid pressure against the piston head when the orifices of the piston head are clogged. The pressure relief valve includes a flat disposed on the piston rod and at least one vent within the piston rod extending to the hydraulic fluid chamber wherein fluid pressure against the piston head causes deflection of the adjacent at least one spring, enabling the opening of the pressure relief valve.

The check valve is configured to close upon extension movement of the assembly, thereby creating rate control.

According to another aspect, there is provided an actuator assembly for an emergency door of a commercial aircraft, the assembly comprising a housing having a first end, an opposing second end and a hollow interior. Connecting end members are provided at the first and second ends of the cylindrical housing. A piston assembly includes a piston rod and a piston head, the piston assembly being movably attached to one of the connecting end members. An accumulator piston is biased by an accumulator spring, the accumulator piston and the piston head each being sealingly engaged within the hollow interior of the cylindrical housing and defining a fluidic chamber therebetween, wherein the piston head includes axial orifices extending therethrough, one of the orifices including a check valve. The actuator assembly further includes a bearing member disposed between the piston head that is sealingly engaged with the assembly housing and at least one spring member disposed adjacent the piston head. Movement of the piston assembly in a first direction causes fluidic flow through each of the orifices of the piston head and fluidic flow is prevented through the check valve when the piston assembly is moved in a second direction opposite to the first direction to create damping as the emergency door is moved to an extended position.

According to an exemplary embodiment, the at least one spring member is disposed in a pre-loaded condition and caused to deflect if the orifices of the piston head become occluded or blocked, thereby enabling a pressure relief valve. In at least one version, the pressure relief valve comprises a flat formed on the piston rod extending to a vent formed in the piston rod adjacent to the flat to permit the passage of fluid when fluid pressure causes the piston head to move against the at least one spring member. The at least one spring member can comprise, for example, a plurality of pre-loaded disc springs.

One of the ends of the assembly housing is attached to the movable door of the commercial aircraft and the opposing end is attached to a fixed portion of the aircraft structure.

According to yet another aspect, there is provided an emergency door system for a commercial aircraft comprising a door movable between an extended and a non-extended position and an actuator assembly. The actuator assembly comprises an actuator assembly that includes a cylindrical housing having opposing first and second ends and a hollow interior containing a hydraulic fluid, the first end being connected to the movable door and the second end being fixedly connected to the aircraft structure. A movable piston assembly is attached to the movable door and disposed within the hollow interior. The piston assembly includes a piston head having a fixed orifice and a check valve disposed in another orifice. At least one preloaded spring member is disposed in relation to the piston head, the at least one preloaded spring member being compressible to create energy storage at the end of the extension stroke.

According to a preferred embodiment, the system includes a pressure relief valve that is enabled when the orifices of the piston head are blocked and unable to move hydraulic fluid and in which the pressure relief valve is enabled when sufficient fluid pressure moves the piston head and causes deflection of the at least one preloaded spring member. The valve further includes a flow path formed in the piston rod by a flat formed in the piston rod and in which deflection of the at least one preloaded spring member and movement of the piston head enables fluid to flow from the high pressure side to the low pressure side of the piston head in the hydraulic chamber.

Advantageously, the actuator/rate control unit provides a consistent spring force over a wide temperature range to open the emergency door of an aircraft, provides speed control to control the opening rate of the door, and provides an energy absorber at the end of the extension stroke to decelerate the door at the fully open position and limit the loads on the door.

It is vital that the emergency door on the aircraft be caused to open for safety and related reasons. The combination energy absorber and pressure relief system in the actuator/rate control unit insures the door can be opened should the piston head orifice holes become plugged for any reason.

These and other features and advantages will be readily apparent from the following Detailed Description, which should be read in conjunction with the accompanying drawings.

DETAILED DESCRIPTION

Figure 1:
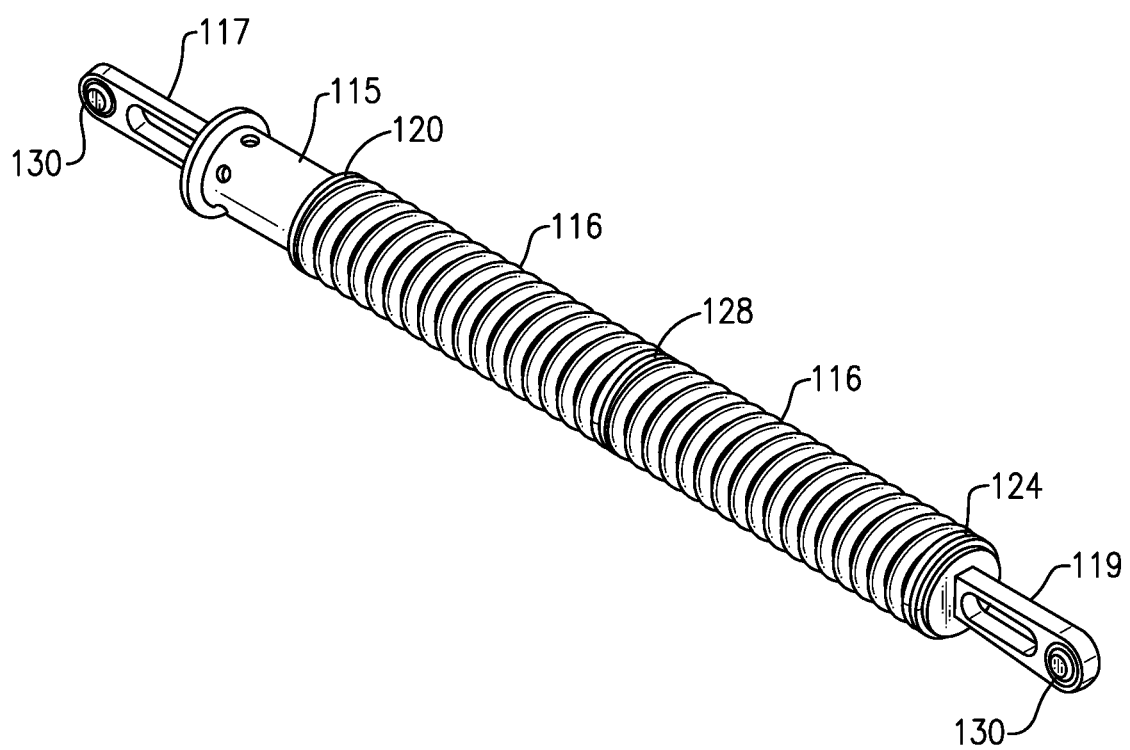
FIG. 1 is a perspective view of an actuator assembly made in accordance with an exemplary embodiment.

This description relates to exemplary embodiments of an actuator assembly, that can be used by way of example in connection with an aircraft emergency door. It will be readily understood, however, that the concepts discussed herein are applicable to other suitable applications and uses in the aircraft, as well as other fields. In addition and throughout this discussion, several terms such as "front", "rear", "above", "below", "distal", "proximal", "inner", "outer" and the like are used in order to provide a suitable frame of reference in regard to the accompanying drawings. These terms, however, are not intended to narrow the intended scope of the invention, unless clearly indicated otherwise.

With reference to FIGS. 1-3B, there is shown an actuator assembly 100 that is made in accordance with an embodiment of the invention. The actuator assembly 100 is defined by an assembly housing 102 made up of a cylindrical shock tube 104, as well as an axial end 108 and a clevis sleeve 134 attached to opposing ends of the shock tube 104. The assembly housing 102 is defined by a hollow interior 105 that is sized and configured to retain a plurality of components, as further discussed herein.

A pair of connecting end members 117 and 119 are attached to a piston rod 140 and an opposing end 112 of the assembly housing 102, respectively. More specifically, the connecting end member 117 engages a sleeve member 115, which slides on the outer diameter of the cylindrical shock tube 104 and the one axial end 108, while the remaining connecting end member 119 is secured to a clevis mount 138, the latter component being attached to the clevis sleeve 134 at the axial end 112 of the assembly housing 102. According to this embodiment, each of the connecting end members 117, 119 are clevises having a spherical bearing 130 disposed at their respective ends.

According to this embodiment, two (2) outer coil springs 116 are mounted in serial fashion onto the exterior of the assembly housing 102 and more specifically between a pair of end flanges 120, 124 installed on the sleeve member 115 and the clevis sleeve 134, respectively. A spring spacer 128 intermediately disposed on the exterior of the cylindrical shock tube 104 separates the two coil springs 116, which when positioned thereon, are loaded in compression.

Figure 2:
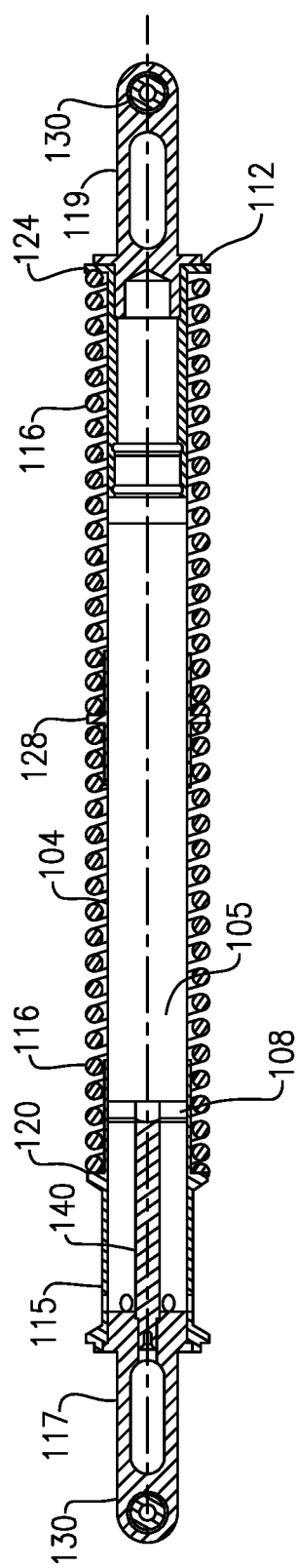
FIG. 2 is a side elevational view of a portion of the partially assembled actuator assembly of FIG. 1, taken in section.

With reference to FIGS. 1 and 2, the connecting end member 117 fixedly retains one end of a piston assembly 132 that movably extends into the interior 105 of the assembly housing 104. In operation and as later discussed in greater detail, the end of the connecting member 117 is attached to a movable door (not shown) or similar structure while the remaining connecting end member 119 is fixedly mounted, such as to an aircraft structure.

Figure 3A:
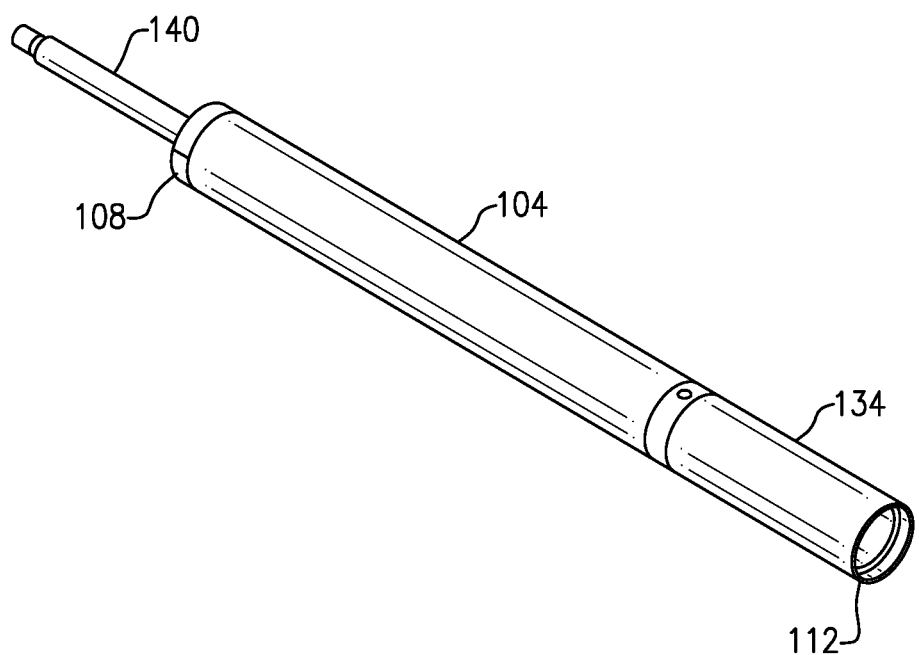
FIG. 3A is a perspective view of a portion of the actuator assembly of FIGS. 1 and 2.
Figure 3B:
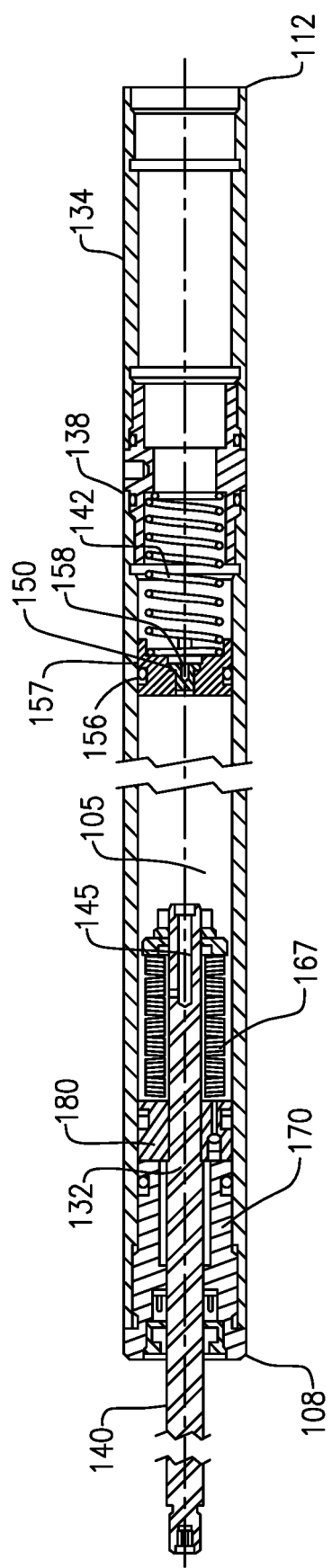
FIG. 3B is a side elevational view, taken in section, of the actuator assembly portion of FIG. 3A.

With reference to FIGS. 3A and 3B, one end 112 of the assembly housing 102 is defined by the clevis sleeve 134 as well as the clevis mount 138, the clevis sleeve 134 being configured to engage one end of the connecting member 119, FIG. 2. The clevis mount 138 is fixedly attached to one end of the cylindrical shock tube 104. An accumulator spring 142 is disposed within an interior portion of the clevis mount 138 with one end of the accumulator spring 142 being attached to an end portion of an axially movable separator 150 (also herein referred to as the "accumulator piston"). The separator 150 is defined by an outer diameter that is slightly smaller than that of the inner diameter of the cylindrical shock tube 104 to permit limited axial movement of the separator 150 and the attached accumulator spring 142. The separator 150 according to this embodiment further includes at least one peripheral sealing member 156, such as an O-ring, formed in an annular exterior groove 157 thereof.

Still referring to FIGS. 3A and 3B and on the opposing side of the assembly (the left hand side of the cylindrical shock tube 104 according to the herein depicted figures), the piston assembly 132 and more specifically one end of a piston rod 140 is fixedly attached to the end connecting member 117. The piston rod 140 extends into the hollow interior 105 of the cylindrical shock tube 104 and entirely through a fixed bearing member 170, the latter being fixedly secured to one end of the shock tube 104. The bearing member 170 according to this embodiment and as more clearly shown in FIG. 5 retains a sealing wiper 174 and a wiper retainer 177, each disposed within a center recess formed in the bearing member 170, which is attached to the end of the shock tube 104 along with a peripheral seal member 175 disposed adjacent to the wiper retainer 177.

The bearing member 170 has an outer diameter that is sized to sealingly engage the inner diameter of the cylindrical shock tube 104. More specifically and according to this embodiment, the bearing member 170 includes at least one annular groove 178 on its exterior surface that receives a sealing element 179, such as an elastomeric O-ring.

Figure 5:
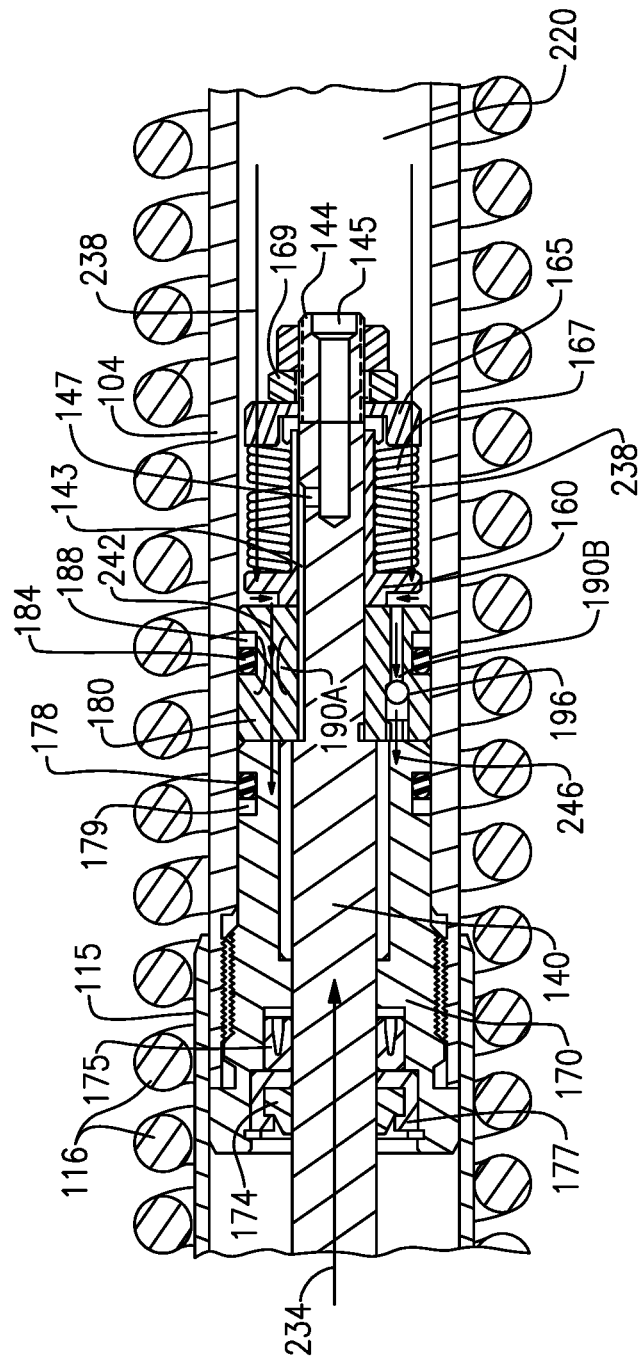
FIG. 5 is an enlarged partial side elevational view, taken in section, of the actuator assembly of FIG. 4 taken during compression of the actuator.

Still referring to FIG. 5, the piston assembly 132 further includes a piston head 180 that is attached to the exterior of a narrowed portion of the piston rod 140. The piston head 180 is defined by an outer diameter that nearly matches that of the inner diameter of the shock tube 104. An elastomeric sealing member 184, such as an elastomeric quad ring or similarly formed member, is disposed within an annular groove 188 provided in the exterior surface of the piston head 180. According to this embodiment, the piston head 180 includes a set of axial orifices 190 including a fixed orifice 190A. Another of the orifices 190B, according to this embodiment, includes a check valve 196 having a movable element, such as a ball that is disposed within an enlarged part of the orifice 190B relative to an adjacent restricted area portion thereof, and in order to open and close depending on the direction of fluid flow, as discussed in greater detail herein.

As best seen in FIGS. 4-8, the piston rod 140 extends inwardly toward the accumulator piston 150 through a formed center opening of the piston head 180 and terminates at a distal end, the piston rod 140 further including a flat 143 disposed in relation to the fixed orifice 190A of the piston head 180. The sleeve-like member 160 is disposed over the extending end of the piston rod 140, including a shelf or flange 163 adjacent to the piston head 180. A cap member 165 is attached onto the distal end of the piston rod 140 by means of a nut or other fastener 169 and a spring means is disposed between the flange 163 of the sleeve-like member 160 and an inner facing surface of the cap member 165. According to this embodiment, the spring means is a plurality of pre-loaded disc springs 167. For the purposes discussed herein, the spring means can alternatively be at least one elastomeric spring, a coil spring or similar device capable of deflection and creating a storage of energy. More specifically, the disc springs 167 are compressively retained in a spacing that is created between the flange 163 and the inner facing surface of the cap member 165 on the exterior of the sleeve-like member 160. The cap member 165 is further defined by a center opening that permits a distal end portion 144 of the piston rod 140 to extend therethrough in which the fastener 169 covers the distal end.

Still referring to FIGS. 4-8, the distal end 144 of the piston rod 140 further includes a small diameter bore 145 that partially extends into the interior of the piston rod 140. This bore 145 terminates at a transversely extending bore 147 proximate the disc springs 167, the latter bore terminating onto the defined flat 143 of the piston rod 140.

A quantity of hydraulic fluid, such as silicone fluid, is added to the interior 105 of the assembly housing 104 through a fill plug 158, the latter being axially provided on the separator 150 according to this embodiment, filling a hydraulic chamber 220 defined between the separator 150 and the piston assembly. Based on the movement of the piston assembly, the fluid is sealingly retained between the separator 150 and the bearing member 170. As discussed herein, the hydraulic fluid is permitted to flow based on movement of the clevis/piston assembly within the interior of the actuator assembly 100 due to compressive and expansive movement thereof.

Operational details relating to the above actuator assembly 100 are herein described with further reference to the schematic figures depicted in FIGS. 4-8.

Figure 4:
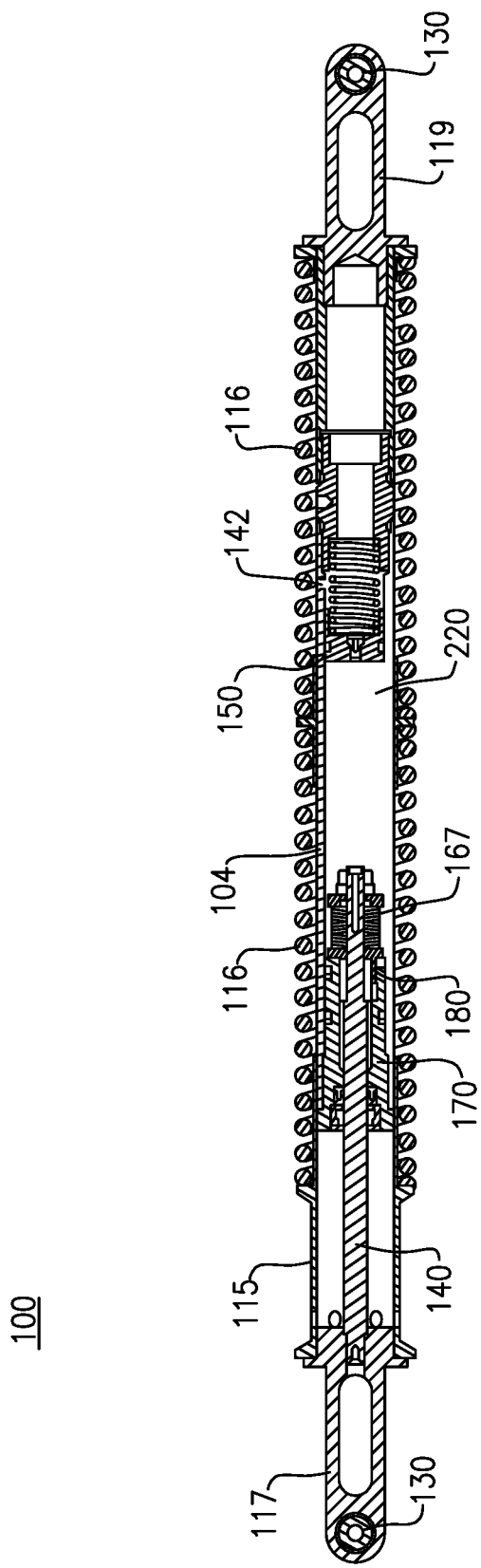
FIG. 4 is a side elevational view of an actuator assembly, shown in section.

Referring to FIG. 4, one of the connecting end members 117 of the actuator assembly 100 (shown on the left) is connected to a door or other movable component under load (not shown) and the remaining connecting end members 119 of the assembly 100 (shown on the right) is fixedly retained such as a ground surface (such as an aircraft fuselage or related structure—also not shown).

As previously noted, the outer coil springs 116 are attached to the exterior of the assembly 100 and retained at their respective ends by end flanges 120, 124 and the spring spacer 128 disposed between the two coil springs 116 according to this embodiment. It should be noted that the overall number of outer coil springs can be varied. For example, one or a plurality of springs can be alternatively utilized in order to provide the required forces. The outer coil springs 116 are maintained in compression according to this embodiment in order to properly urge the actuator assembly 100, as herein described.

To review and according to this embodiment, the accumulator spring 142 is disposed in one end (the right end according to this embodiment) in relation to the end connecting member 119 along with an air chamber formed within the interior of the clevis sleeve 134 and clevis mount 138. The piston assembly 132 is provided on the opposing side of the actuator assembly 100, the piston assembly having the movable piston rod 140 and attached piston head 180. The piston rod 140 is fixedly attached to the connecting end member 117, wherein the piston head 180 includes a plurality of axial orifices 190 that permit movement of hydraulic fluid (not shown) therethrough relative to a hydraulic fluid chamber 220 disposed between the piston assembly 132 and the accumulator piston (separator 150).

The piston assembly 132 is sealingly attached to the interior of the assembly housing 102 and includes an energy absorber at its distal end adjacent the piston head 180.

As previously noted, the energy absorber according to this version includes a plurality of disc springs 167 that are retained (pre-loaded) in compression within the spacing provided between the sleeve like member 160 and cap member 165, the latter being attached to the distal end of the piston assembly 132. The accumulator spring 142 provides movement due to volume displacement of the piston rod 140 into and out of the defined hydraulic fluid chamber 220 and also to compensate for thermal (temperature) effects on the overall actuator assembly 100.

According to this embodiment, the distal end of the piston rod 140 further includes a defined small diameter bore 145 that extends intermediately to a transversely extending bore 147, the latter further extending to the exterior of the piston rod 140 and on the defined flat 143 of the piston rod 140, which is located in relation to the piston head 180 and the disposed disc springs 167.

In operation and with reference to FIG. 5, and upon application of a compressive force upon the herein described assembly 100, the piston assembly is caused into the interior of the assembly housing 102, as illustrated per arrow 234. As a result of this movement, fluid flows per arrow 246 from the hydraulic chamber 220 through the fixed orifice 190A of the piston head 180 and opens the check valve 196 of the piston head 180 as fluid is caused to move in an opposing direction to that of the piston assembly 132. More specifically, fluid is moved around the retained disc springs 167 and then through the orifices 190 of the piston head 180. The sealing member 188 of the piston head 180 prevents flow of fluid other than through the defined orifices 190, wherein the bearing member 170 and associated sealing members 178 prevents fluid from movement beyond the bearing member 170. In the meantime, the outer coil springs 116 compress and create a biasing force against the applied load.

The volume of the piston rod 140 entering the fluid chamber 220 causes the accumulator piston 150, FIG. 4, to move to the right toward the end 112. In this mode, there is no restriction on fluid movement or in movement of the actuator assembly 100 with the only restrictive force being applied being the biasing force of the outer coil springs 116. This allows the door (not shown) to be closed easily with minimal resistance from the damper.

Figure 6:
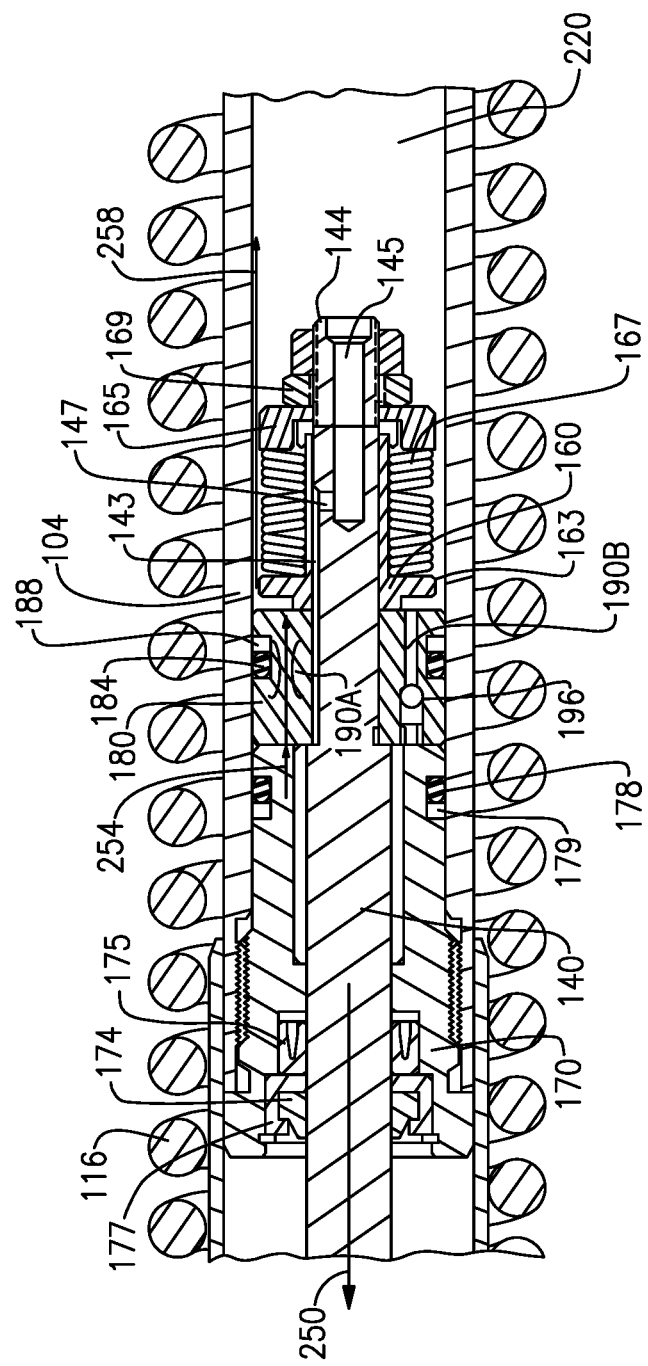
FIG. 6 is the enlarged partial side elevational view, in section, of the actuator assembly of FIGS. 4 and 5, taken during an extension phase of the actuator assembly.

As shown in FIG. 6, when the actuator assembly 100 is extended based on cessation of the applied load and through restoration by the outer coil springs 116, the piston rod 140 is moved toward to the end of the assembly (as shown moving to the left by arrow 250). Hydraulic fluid is therefore moved or directed through the fixed orifice 190A of the piston head 180, but not through the check valve 190, which obstructs fluid movement as the piston head 180 is also moved to the left according to this Figure and providing a rate control to the movement of the assembly 100. During this movement, the outer coil springs 116 extend to restore the assembly 100 to its pre-loaded condition. In this mode of operation, the piston rod volume exiting the hydraulic fluid chamber 220 moves the accumulator piston (separator 150) toward the end 108 further aided by the biasing force of the accumulator spring 142, restoring same to its original or home position. During extension of the actuator, the springs 116 push the attached door open and the damping force from the fluid flowing through the fixed orifice controls the opening rate of the door.

Figure 7:
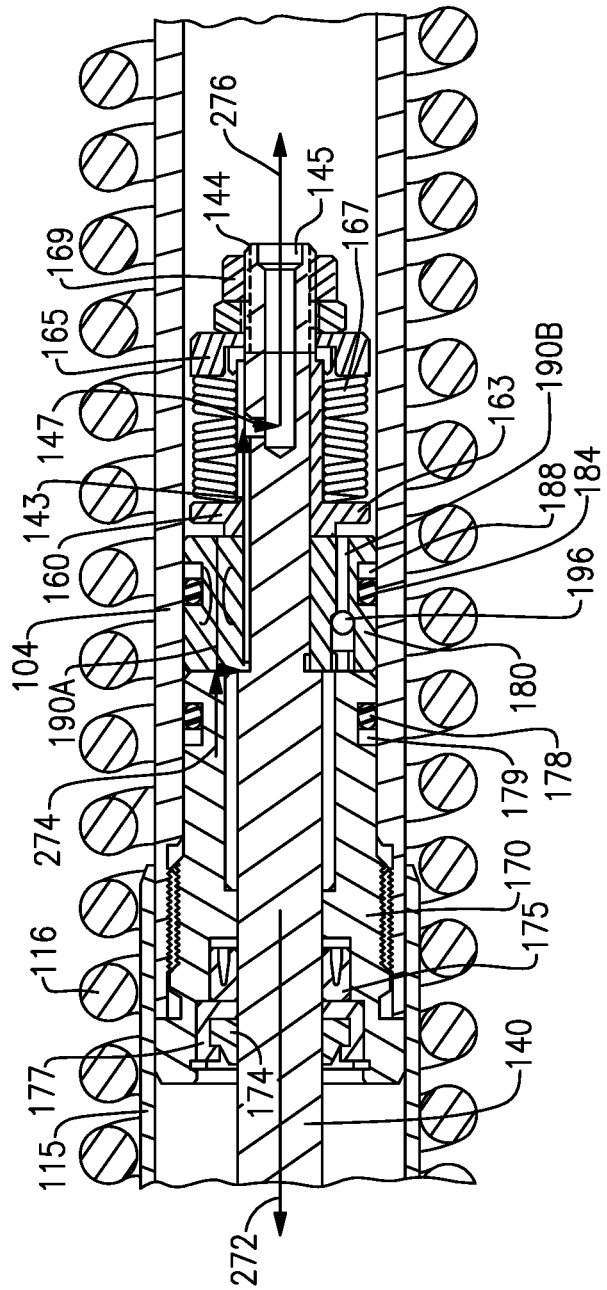
FIG. 7 is another enlarged partial side elevational view, in section, of the actuator assembly of FIGS. 4-6, taken during the extension phase of the actuator and in which the fixed orifice of the piston head is occluded, including a pressure relief functionality.

A full extension of the herein described actuator assembly 100 is depicted according to FIG. 7. In this mode of operation and as previously described, the check valve 190 prevents fluid movement through the piston head 180 and the only available movement of hydraulic fluid is through the fixed orifice 190A. Movement of the piston assembly toward the end 108 of the assembly housing 102 is shown by arrow 272. In the event that the fixed orifice 190A of the piston head 180 becomes plugged or occluded according to this embodiment, accumulated fluid pressure moves the piston head 180 to the right, as shown per arrow 274 in which the accumulated pressure overcomes the compressive force of the disc springs 167 to permit this movement. This latter axial movement of the piston head 180 compresses the preloaded disc springs 167, which therefore allows fluid flow, see arrow 276, across the piston head 180 through the defined flat 143 in the piston rod 140 and through each of the bores 147, 145 defined in the end of the piston rod 144, the latter components acting as a pressure relief valve, to enable flow of fluid into the hydraulic fluid chamber 220 of the actuator assembly 100. As in the preceding, the piston rod volume exiting the chamber 220 moves the accumulator piston 130 toward the end 112 of the assembly housing 102.

Figure 8:
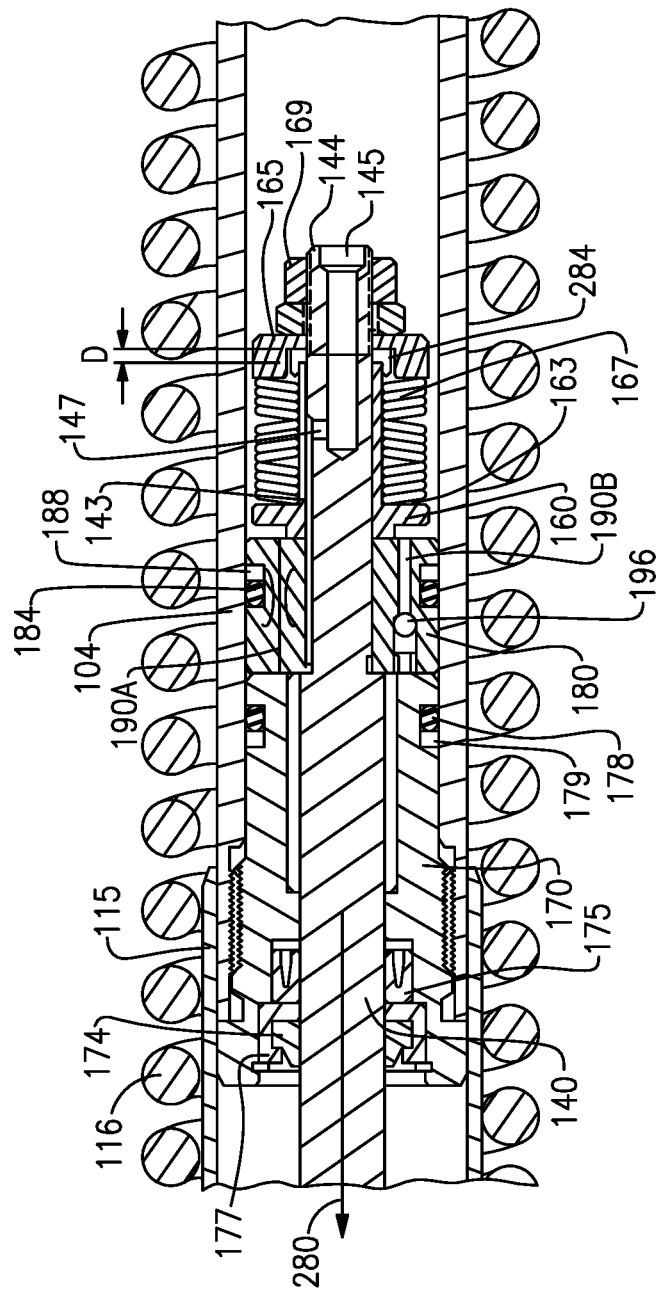
FIG. 8 is another enlarged partial side elevational view, in section, of the actuator assembly of FIGS. 4-7, taken during full extension of the actuator assembly and utilizing an energy absorbing function of the assembly against loads encountered during full extension.

Finally and as shown in FIG. 8, the herein described actuator assembly 100 is shown in its fully extended position in which the piston head 180 has already bottomed out on the bearing member 170, see arrow 280. In this position, the emergency door of the aircraft (not shown) would be fully open, but it is possible additional loads can be imparted to the door, such as high wind forces, with the door now outside of the fuselage. These forces would act to pull upon the piston rod 140, as shown in the figure, wherein the set of disc springs 167 according to this embodiment are caused to compress, creating the deflection shown, towards the piston head 180. The foregoing therefore creates a storage of energy based on the applied load to the actuator assembly 100 and a deflection D of the disc springs 167 as shown. This feature is also used to decelerate the door when it opens, as opposed to hitting a hard stop.

PARTS LIST FOR FIGS. 1-8

100 actuator assembly
102 assembly housing
104 cylindrical shock tube
105 hollow interior, assembly housing
108 axial end, assembly housing
112 axial end, assembly housing
115 sleeve member
116 outer coil springs
117 connecting end member
119 connecting end member
120 end flange
124 end flange
128 spring spacer
130 spherical bearing
132 piston assembly
134 clevis sleeve
138 clevis mount
140 piston rod
142 accumulator spring
143 flat, piston rod
144 distal end, piston rod
145 bore, extending
147 transversely extending bore
150 separator (accumulator piston)
156 peripheral sealing member
157 annular groove
158 fill plug 160 sleeve-like member
163 shelf
165 cap member
167 disc springs, plurality
169 fastener
170 bearing member
174 sealing wiper
175 peripheral sealing member
177 retainer, wiper
178 annular groove
179 sealing member
180 piston head
184 sealing member, elastomeric
188 annular groove
190 axial orifices
190A fixed orifice
190B orifice
196 check valve
220 hydraulic fluid chamber
234 arrow
238 arrow
242 arrow
246 arrow
250 arrow
254 arrow
258 arrow
262 arrow
264 arrow
268 arrow
272 arrow
274 arrow
276 arrow
280 arrow
284 spacing
D deflection It will be readily apparent that other variations and modifications are possible to those of sufficient skill and within the scope of the following claims.

The invention claimed is:

1. An actuator assembly comprising:
an assembly housing having opposing first and second ends and a hollow interior defining a chamber containing a hydraulic fluid;
a movable piston assembly disposed within the interior, the piston assembly including a piston rod supporting a piston head, the piston head having a fixed orifice and a check valve disposed in another orifice; and
at least one spring disposed attached to a distal end of the piston rod and distally in relation to the piston head, the at least one spring being preloaded in compression to create energy storage at the end of an extension stroke of the piston head.

2. The actuator assembly according to claim 1, further comprising a pressure relief valve which is enabled by movement of the piston head against the at least one spring that is caused to move in the event the fixed orifice of the piston head is blocked to enable fluid flow along a defined flow path through or around the piston head from a high pressure side of the piston head to a low pressure side in the chamber containing the hydraulic fluid.

3. The actuator assembly according to claim 2, wherein one connecting end of the housing including the piston assembly is configured for attachment to an emergency door of an aircraft and an opposing connecting end of the housing is configured for fixed attachment to an aircraft structure.

4. The actuator assembly according to claim 3, wherein the check valve prevents fluid from moving through the orifice when the assembly housing is moved in tension.

5. The actuator assembly according to claim 1, including an accumulator piston disposed in an end of the assembly housing opposite the piston assembly, the accumulator piston being biased by a coil spring.

6. The actuator assembly according to claim 1, further including at least one pre-loaded coil spring attached onto an exterior of the assembly housing.

7. An actuator assembly comprising:
an assembly housing having opposing first and second ends and a hollow interior;
at least one coil spring attached to an exterior of the assembly housing;
a bearing member fixedly attached within the hollow interior of the assembly housing and being sealingly engaged therewith;
a piston assembly comprising:
a piston rod; and
a piston head supported by the piston rod and having a plurality of axial orifices, the piston assembly being movable through a sealed opening of the bearing member into a chamber filled with hydraulic fluid;
a check valve disposed in one of the axial orifices, the check valve preventing fluid flow through the orifice when fluid is moved in one axial direction;
an accumulator piston biased by an accumulator spring at an opposite end of the assembly housing relative to the bearing member; and
at least one spring coupled to a distal end of the piston rod within the hollow interior of the assembly housing and distal to the piston head, the at least one spring being pre-loaded in compression to enable energy storage of an applied load at the end of an extension stroke of the piston head.

8. The actuator assembly according to claim 7, in which the actuator assembly is connected to an emergency door of an aircraft.

9. The actuator assembly according to claim 8, in which the pressure relief valve includes a flat disposed on the piston rod and at least one vent within the piston rod extending to the hydraulic fluid chamber wherein fluid pressure against the piston head causes deflection of the adjacent at least one spring, enabling the opening of the pressure relief valve.

10. The actuator assembly according to claim 7, including a pressure relief valve that is enabled by fluid pressure against the piston head when the axial orifices of the piston head are unable to move hydraulic fluid through the piston head.

11. The actuator assembly according to claim 7, wherein the check valve is configured to close when the actuator assembly is placed in tension, thereby creating a rate control.

12. The actuator assembly according to claim 7, wherein the at least one spring comprises a set of disc springs, preloaded in compression.

13. An actuator assembly for an emergency door of a commercial aircraft, the assembly comprising:
a housing having a first end, an opposing second end and a hollow interior;
connecting end members at the first and second ends of the housing;
at least one coil spring attached to the exterior of the housing;

a piston assembly including a piston rod and a piston head, the piston assembly being movably attached to one of the connecting end members;

an accumulator piston biased by an accumulator spring, the accumulator piston and the piston head each being sealingly engaged within the hollow interior of the cylindrical housing and defining a fluidic chamber therebetween, wherein the piston head includes axial orifices extending therethrough, one of the orifices including a check valve;

a bearing member disposed between the piston head and the first end that is sealingly engaged with the assembly housing; and at least one spring member disposed adjacent the piston head in which movement of the piston assembly in a first direction causes fluidic flow through each of the orifices of the piston head and in which fluidic flow is prevented through the check valve when the piston assembly is moved in a second direction opposite to the first direction to create damping as the emergency door is moved to an open position.

14. The actuator assembly according to claim 13, in which the at least one spring member is disposed in a pre-loaded condition and caused to deflect if the orifices of the piston head become occluded, thereby enabling a pressure relief valve.

15. The actuator assembly according to claim 14, in which the pressure relief valve comprises a flat formed in the piston rod and a vent formed in the piston adjacent to the flat to permit the passage of fluid when fluid pressure causes the piston head to move against the at least one spring member.

16. The actuator assembly according to claim 13, in which the at least one spring member comprises a plurality of pre-loaded disc springs.

17. The actuator assembly of claim 13, in which one end of the housing is attached to a movable door of a commercial aircraft and the opposing end is attached to a fixed portion of the aircraft structure.

18. An emergency door system for a commercial aircraft, comprising:

a door being movable between an opened and a closed position; and an actuator assembly comprising:

an assembly housing having opposing first and second ends and a hollow interior containing a hydraulic fluid, the first end being connected to the movable door and the second end being fixedly connected to the aircraft structure;

a movable piston assembly attached to the movable door and disposed within the hollow interior, the piston assembly including a piston head having a fixed orifice and a check valve disposed in another orifice;

at least one spring member disposed on a distal end of the piston rod and distally in relation to the piston head, the at least one preloaded spring member being preloaded in compression to create energy storage at the end of an extension stroke of the piston head; and at least one coil spring attached to an exterior of the assembly housing.

19. The system according to claim 18, including a pressure relief valve that is enabled when the orifices are clogged and unable to move hydraulic fluid through the piston head and in which the pressure relief valve is enabled when fluid pressure moves the piston head and causes deflection of the at least one preloaded spring member.

20. The system according to claim 19, including a vent disposed in the piston rod adjacent a flat formed in the piston rod and in which deflection of the at least one preloaded spring member and movement of the piston head enables fluid to pass from a high pressure side to a low pressure side of the piston head in the interior containing the hydraulic fluid through the flat and vent.

* * * * *